Sept. 27, 1955  J. E. YINGER  2,718,947
LATCH OPERATED CLUTCH
Filed June 11, 1953  2 Sheets-Sheet 1
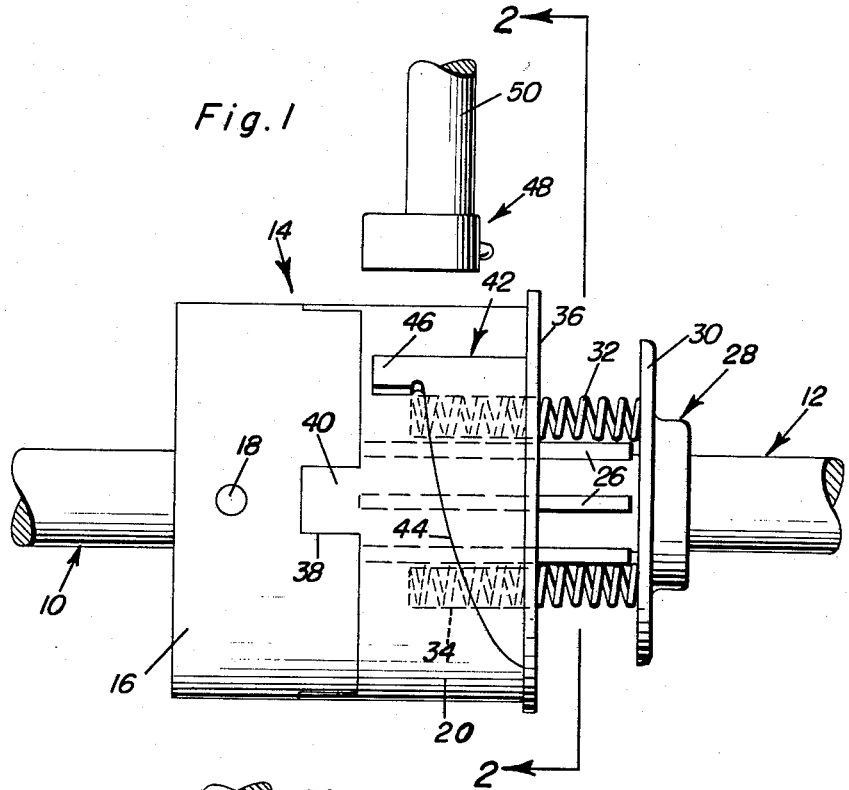
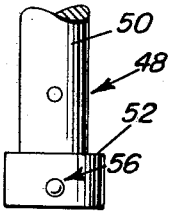
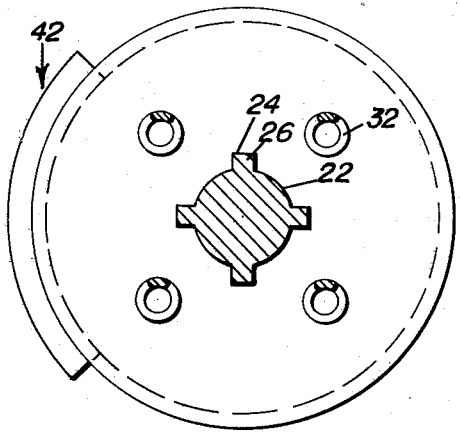
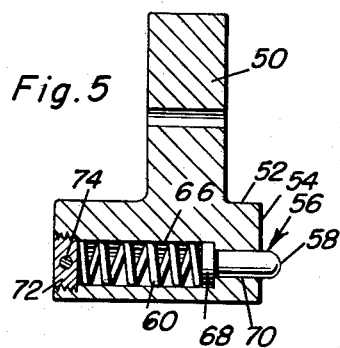
John E. Yinger
INVENTOR.

Sept. 27, 1955　　　　　　J. E. YINGER　　　　　　2,718,947
LATCH OPERATED CLUTCH
Filed June 11, 1953　　　　　　　　　　　　　　2 Sheets-Sheet 2

John E. Yinger
INVENTOR.

United States Patent Office 2,718,947
Patented Sept. 27, 1955

2,718,947

LATCH OPERATED CLUTCH

John E. Yinger, Frederick, Md., assignor of one-half to Dora Yinger, Frederick, Md.

Application June 11, 1953, Serial No. 361,021

2 Claims. (Cl. 192—24)

This invention relates generally to clutch mechanisms and pertains more particularly to an improved construction of axially engageable clutch.

A primary object of this invention is to provide improvements in axially operated clutches whereby the clutch elements thereof are actuated in such a manner as to provide a smooth and complete clutching disengagement, the same being accomplished with a minimum of elements.

Another object of this invention is to provide an improved form of axially engageable clutch mechanism in which the initial disengaging action of associated clutch elements is operative to permit further and subsequent spacing between the clutch elements into positively declutched position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevation of the improved clutch assembly showing the parts in normally engaged position;

Figure 2 is a transverse section taken substantially on the plane of section line 2—2 of Figure 1;

Figure 5 is a vertical section through the clutch release member showing details of its construction.

Figure 3:
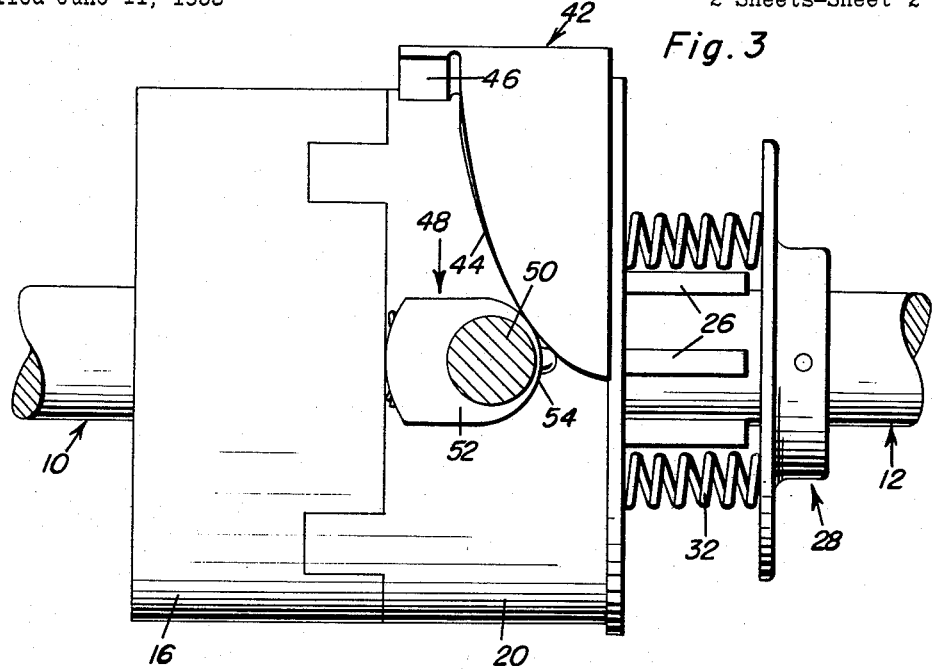
Figure 3 is a top plan view of the clutch assembly showing its initial position of disengagement.

Referring now more particularly to Figure 1, reference numeral 10 indicates generally a drive shaft which may be suitably connected to any source of power desired while reference character 12 indicates generally a driven shaft to which the power from shaft 10 is desired to be intermittently connected by means of the axially engageable clutch assembly indicated generally by the reference character 14. The clutch assembly includes a first clutch jaw 16 rigidly secured to the drive shaft 10 as by the pin 18 and the second clutch jaw 20 is provided with the longitudinal bore 22 having the circumferentially spaced recesses 24 which receives the line 26 on the free end of the driven shaft 12, see Figure 2. In this manner, the second clutch jaw is slidably engaged on the driven shaft, as will be readily apparent.

A pressure plate 28 is rigidly secured to the driven shaft 12 by any suitable means and the plate includes the annular flange 30 which provides an abutment for the coil spring 32, these springs being projectable into and seated within the longitudinal recesses 34 provided in the rear face 36 of the second clutch jaw. By this construction, it will be manifest that the second clutch jaw 20 is urged normally into engagement with the first clutch jaw. In this respect, it will be noted that the first clutch jaw 16 is provided with the radially extending notches 38 and the second jaw 20 is provided with the radial projections 40 received therein to impart driving motion between the two jaws.

A cam 42 is provided on the outer surface of the second clutch jaw and includes the cam surface 44 and the stop shoulder 46 for a purpose presently apparent. As seen most clearly in Figures 3 and 4, the clutch release member which is indicated generally by the reference character 48 is provided with a shank portion 50 and an enlarged head 52 having the rounded cam face 54 thereon which is movable into and out of engagement with the cam 42 by any suitable mechanism, not shown. Although the clutch release member is herein shown and described as movable into engagement with the cam 42 radially of the clutch jaw and the driving and driven shafts, it is to be understood that such movement of the clutch release member is not necessarily that limited, it being within the province of this invention to move the release member into engagement with the cam in an arcuate motion for example.

Figure 4:
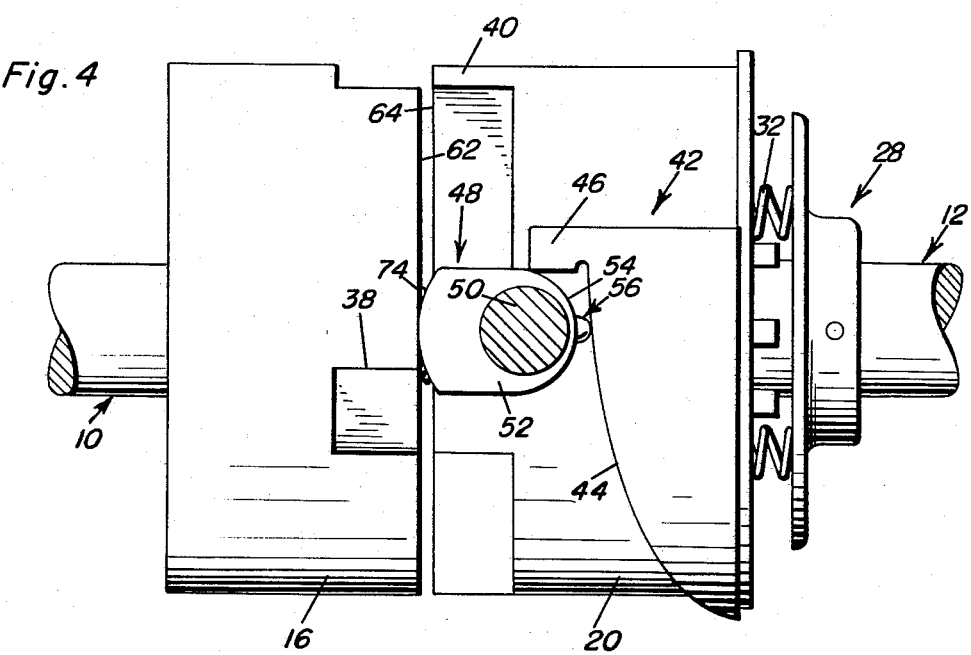
Figure 4 is a view similar to Figure 3 but showing the clutch in completely disengaged position.

With the shaft and the corresponding clutch jaws rotating, the release member is moved into the path of movement of the cam 42 and its cam face 54 will engage against the cam surface 44 to urge the jaw 20 along the shaft 12 away from the jaw 16. During this motion, the plunger 56 carried by the head 52 is forced into a position with its projecting end 58 flush with the cam face 54, or substantially so, it being evident that during the camming action wherein the projections 40 are within the notches 38, only the cam face 54 will serve to disengage the jaw elements inasmuch as the spring 60 associated with the plunger 56 is not sufficiently strong to impart disengagement between the jaws while driving engagement therebetween still exists. However, when the assembly has reached the position as shown in Figure 4 with the enlarged head 52 in engagement with the stop shoulder 46 of the cam, the lip of the cam will have just disengaged the clutch jaws so that the adjacent faces 62 and 64 thereof are disposed in very closely spaced relation but immediately upon disengagement between the jaws, the spring 60, being stronger than springs 32 combined, will urge the plunger 56 within the recess 66 in the release member to the position shown in Figure 5 wherein the collar 68 of the plunger will engage the face formed between the larger recess 66 and the smaller recess 70 through which the shank portion of the plunger 56 projects, a suitable threaded plug 72 serving to abut the other end of the spring 60 in the manner shown. The plug may, of course, be provided with a pin member 74 for maintaining it in place. When the plunger has thus been positioned under the action of spring 60, the clutch jaws will be in the position shown in Figure 4 wherein their adjacent surfaces 62 and 64 will be spaced apart a distance corresponding to the movement of the plunger 56 outwardly of the head 52, as will be readily apparent.

In this manner, complete and effective disengagement between the clutch jaws 16 and 20 will be effected. It will be appreciated that the above described assembly overcomes the very annoying and inefficient actuation of clutch mechanisms of this type inasmuch as the usual construction embodies a cam element similar to that shown and a clutch release member having only an enlarged head engageable therewith. To maintain the cam actuation within the bounds of practicality, the effective lift thereof must be kept sufficiently low to prevent undue shock to the various component parts of the clutch, this resulting in a disengagement between the jaws of the clutch assembly only to such a point as the adjacent clutch jaws are just barely disengaged when the camming action is complete, thus permitting grabbing, chattering and chipping between the clutch jaws when the parts have become worn a slight amount. This, of course is highly undesirable and is overcome completely by the plunger mechanism shown and described inasmuch as its secondary camming action will positively disengage the clutch jaws to space them apart in the manner shown in Figure 4 to obviate any grabbing or chattering between the clutch jaws which might otherwise occur.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A clutch assembly comprising a pair of coaxial shafts disposed in juxtaposed relation, a first clutch jaw rigidly secured to one of said shafts, a second clutch jaw slidably secured to the other of said shafts, means for normally urging said jaws into engagement, said second jaw having a cam element thereon, a clutch release member movable into and out of the path of movement of said cam element for urging the second jaw out of engagement with the first, and means on said release member for urging said first and second jaws into spaced relation subsequent to their disengagement, said means comprising a plunger slidably carried by said release member, and a spring for urging the plunger outwardly of said release member.

2. A clutch assembly comprising a pair of coaxial shafts disposed in juxtaposed relation, a first clutch jaw rigidly secured to one of said shafts, a second clutch jaw slidably secured to the other of said shafts, one of said jaws being notched and the other of said jaws having projections received therein, means for normally urging said jaws into engagement, a cam disposed peripherally on said second jaw, a clutch release member movable into and out of the path of movement of said cam for urging the second jaw out of engagement with the first, and means on said release member for urging said jaws into spaced apart relation subsequent to their disengagement, said means comprising a plunger slidably carried by said release member, and a spring for urging the plunger outwardly of said release member.

References Cited in the file of this patent

UNITED STATES PATENTS

| | | |
|---|---|---|
| 1,227,191 | Patrick | May 22, 1917 |
| 1,746,392 | Grace | Feb. 11, 1930 |
| 2,014,758 | Boyd | Sept. 17, 1935 |
| 2,104,265 | Marsden | Jan. 4, 1938 |